(12) United States Patent
Miyoshi et al.

(10) Patent No.: US 10,218,048 B2
(45) Date of Patent: Feb. 26, 2019

(54) VEHICLE

(71) Applicant: Nidec Corporation, Kyoto (JP)

(72) Inventors: Akito Miyoshi, Kawasaki (JP);
Hiroyuki Kamo, Kawasaki (JP);
Masahiro Shindo, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 199 days.

(21) Appl. No.: 15/408,630

(22) Filed: Jan. 18, 2017

(65) Prior Publication Data

US 2017/0207513 A1 Jul. 20, 2017

(30) Foreign Application Priority Data

Jan. 19, 2016 (JP) .................. 2016-008157

(51) Int. Cl.
| | |
|---|---|
| *H01Q 1/12* | (2006.01) |
| *H01Q 1/38* | (2006.01) |
| *B32B 17/10* | (2006.01) |
| *G01S 7/03* | (2006.01) |
| *H01Q 1/32* | (2006.01) |

(Continued)

(52) U.S. Cl.
CPC ..... *H01Q 1/1271* (2013.01); *B32B 17/10036* (2013.01); *B32B 17/10201* (2013.01); *G01S 7/03* (2013.01); *G01S 13/931* (2013.01); *H01Q 1/38* (2013.01); *B32B 17/10045* (2013.01); *G01S 2013/9392* (2013.01); *H01Q 1/3233* (2013.01); *H01Q 13/02* (2013.01)

(58) Field of Classification Search
CPC ...... H01Q 1/1271; H01Q 1/38; H01Q 1/3233; H01Q 13/02; B32B 17/10036; B32B 17/10045; G01A 7/03; G01A 13/931; G01S 2013/9332
See application file for complete search history.

(56) References Cited

U.S. PATENT DOCUMENTS

| | | |
|---|---|---|
| 2,659,884 A | 11/1953 | McMillan et al. |
| 3,002,190 A | 9/1961 | Oleesky et al. |

(Continued)

FOREIGN PATENT DOCUMENTS

| | | |
|---|---|---|
| CN | 1961456 A | 5/2007 |
| CN | 101512833 A | 8/2009 |

(Continued)

*Primary Examiner* — Dameon E Levi
*Assistant Examiner* — David Lotter
(74) *Attorney, Agent, or Firm* — Keating & Bennett, LLP

(57) ABSTRACT

A vehicle includes a windshield, at least a surface on a vehicle interior side thereof being a surface of glass; an antenna part provided in the vehicle interior and for transmitting a transmission wave, which is a radio wave in a millimeter waveband, from the vehicle interior through the windshield to the outside; and a reflection suppression layer including a dielectric layer that adheres to the surface on the antenna part side of the windshield. The dielectric layer has a refractive index lower than that of the glass. The dielectric layer has a thickness that allows reflection of the transmission wave to be suppressed by interference between a reflected wave generated by reflection of the transmission wave on an interface between the dielectric layer and the windshield, and a reflected wave generated by reflection of the transmission wave on a surface on the antenna part side of the dielectric layer.

20 Claims, 5 Drawing Sheets

(51) Int. Cl.
    *H01Q 13/02*     (2006.01)
    *G01S 13/93*     (2006.01)

(56) References Cited

U.S. PATENT DOCUMENTS

| | | |
|---|---|---|
| 3,780,374 A | 12/1973 | Shibano et al. |
| 4,179,699 A | 12/1979 | Lunden |
| 4,677,443 A | 6/1987 | Koetje et al. |
| 4,725,475 A | 2/1988 | Fiscus et al. |
| 5,017,939 A | 5/1991 | Wu |
| 5,408,244 A | 4/1995 | Mackenzie |
| 6,028,565 A | 2/2000 | Mackenzie et al. |
| 7,460,054 B2 | 12/2008 | Kim et al. |
| 2002/0067305 A1 | 6/2002 | LeBlanc et al. |
| 2008/0224939 A1 | 9/2008 | Christ |
| 2009/0040111 A1* | 2/2009 | Schmidt ............... H01Q 1/3233 343/700 MS |
| 2010/0019978 A1 | 1/2010 | Okada et al. |
| 2010/0039346 A1 | 2/2010 | Peter et al. |
| 2015/0109162 A1 | 4/2015 | Binzer |
| 2015/0260827 A1 | 9/2015 | Hansen et al. |
| 2016/0093944 A1 | 3/2016 | Kamo |
| 2016/0231417 A1* | 8/2016 | Aoki ..................... G01S 13/931 |

FOREIGN PATENT DOCUMENTS

| | | |
|---|---|---|
| CN | 104648296 A | 5/2015 |
| CN | 104908692 A | 9/2015 |
| CN | 204936956 U | 1/2016 |
| EP | 0 888 646 B1 | 1/1999 |

\* cited by examiner

VEHICLE

TECHNICAL FIELD

The present invention relates to a vehicle having an antenna part in the interior.

BACKGROUND ART

There are automobiles with antennas for radiating radar waves and receiving reflected waves, each of which is mounted at the front nose or in the vicinity of the rear gate. However, these parts of the automobiles are the first to be deformed or damaged in cases of collisions with other vehicles or objects, even if the collisions are minor ones, and a radar mounted on such a part is also highly likely to be damaged. The radar is a device that is necessary to ensure the safety of automobiles, and it is not desirable for the radar to lose its functionality due to minor collisions. This is all the more so if automatic driving is put into practical use.

Such undesirable situations are less likely to occur if the radar device is mounted in the interior of a vehicle, but in that case, the radar device needs to transmit and receive radar waves through the windshield including glass. In this case, the reflection and absorption of the waves by the glass are unavoidable, and the radar will have limited detection capabilities.

European Patent No. 888646 discloses that, when a communication antenna is installed in the interior of a vehicle, an intermediate dielectric member is inserted between glass and the radiating surface of the antenna in order to suppress the reflection of a radio wave by the glass. According to European Patent No. 888646, the electrically effective distance between the glass and the antenna is adjusted to several times the half-wavelength of the wave.

When a radio wave in the millimeter waveband is used as a transmission wave, strong reflection will occur on the surface of the windshield including glass. Even in the case where the intermediate dielectric member is arranged between the glass and the radiating surface of the antenna as in European Patent No. 888646, strong reflection will occur on the surface of the dielectric member itself. Additionally, since the windshield is ordinarily inclined with respect to the radiating surface of the antenna, the distance between the glass and the antenna cannot be adjusted to a constant value, such as several times the half-wavelength of the radio wave. Thus, there is demand for a new technique for reducing loss of a transmission wave passing through the windshield.

SUMMARY OF INVENTION

The present invention is intended for a vehicle, and it is an object of the present invention to reduce loss of a transmission wave passing through the windshield.

An exemplary vehicle of the present invention includes a vehicle body, a drive mechanism for moving the vehicle body, a windshield located between a vehicle interior and an outside, at least a surface on the vehicle interior side of the windshield being a surface of glass, an antenna part provided in the vehicle interior and for transmitting a transmission wave from the vehicle interior through the windshield to the outside, the transmission wave being a radio wave in a millimeter waveband, and receiving a reflected wave that enters the vehicle interior from the outside through the windshield, a reflection suppression layer including a dielectric layer that adheres to the surface on the antenna part side of the windshield, a high-frequency oscillator for outputting high-frequency electric power to the antenna part, and a receiver for receiving input of a radio wave received by the antenna part and outputting a received signal. The dielectric layer has a refractive index that is lower than a refractive index of the glass and higher than a refractive index of air. The dielectric layer has a thickness that allows reflection of the transmission wave to be suppressed by interference between a reflected wave generated by reflection of the transmission wave on an interface at which the dielectric layer adheres to the surface of the windshield, and a reflected wave generated by reflection of the transmission wave on a surface on the antenna part side of the dielectric layer.

Another exemplary vehicle of the present invention includes a vehicle body, a drive mechanism for moving the vehicle body, a windshield located between a vehicle interior and an outside, at least a surface on the vehicle interior side of the windshield being a surface of glass, an antenna part provided in the vehicle interior and for transmitting a transmission wave from the vehicle interior through the windshield to the outside, the transmission wave being a radio wave in a millimeter waveband, and receiving a reflected wave that enters the vehicle interior from the outside through the windshield, a reflection suppression layer including a dielectric layer that adheres to the surface on the antenna part side of the glass, a high-frequency oscillator for outputting high-frequency electric power to the antenna part, and a receiver for receiving input of a radio wave received by the antenna part and outputting a received signal. The dielectric layer has a refractive index that is lower than a refractive index of the glass and higher than a refractive index of air. The antenna part includes a transmitting antenna for transmitting the transmission wave. If the transmission wave has a vertical polarization component greater than a horizontal polarization component thereof with respect to the reflection suppression layer, relationships expressed by Formulas 1 and 2 are satisfied, where $\theta_a$ is an incident angle of the transmission wave on the reflection suppression layer at a center of a main lobe of the transmitting antenna, $n_s$ is the refractive index of the dielectric layer, $n_g$ is the refractive index of the glass, $n_i$ is a refractive index of a medium that is adjacent to the dielectric layer on the antenna part side, $\lambda$ is a wavelength of the transmission wave in air, N is an integer of 0 or more, and d is a thickness of the dielectric layer.

If $n_i < n_s <$ [Formula 1]

$n_g$ and $\theta_a$ is smaller than or greater than both of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N+\frac{3}{4}\right)n_s \lambda \cos\left(\sin^{-1}\left(\frac{1}{n_s}\sin\theta_a\right)\right)}{4(n_s^2 - \sin^2\theta_a)} \leq$$

$$d \leq \frac{\left(2N+\frac{5}{4}\right)n_s \lambda \cos\left(\sin^{-1}\left(\frac{1}{n_s}\sin\theta_a\right)\right)}{4(n_s^2 - \sin^2\theta_a)}, \text{ and}$$

if $n_i < n_s < n_g$ and $\theta_a$ is a value between or equal to one of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N+\frac{7}{4}\right)n_s \lambda \cos\left(\sin^{-1}\left(\frac{1}{n_s}\sin\theta_a\right)\right)}{4(n_s^2 - \sin^2\theta_a)} \leq$$

$$d \leq \frac{\left(2N+\frac{9}{4}\right)n_s \lambda \cos\left(\sin^{-1}\left(\frac{1}{n_s}\sin\theta_a\right)\right)}{4(n_s^2 - \sin^2\theta_a)}$$

-continued

If $n_i > n_s <$ [Formula 2]

$n_g$ and $\theta_a$ is smaller than or greater than both of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N + \frac{7}{4}\right)n_s\lambda\cos\left(\sin^{-1}\left(\frac{1}{n_s}\sin\theta_a\right)\right)}{4(n_s^2 - \sin^2\theta_a)} \leq$$

$$d \leq \frac{\left(2N + \frac{9}{4}\right)n_s\lambda\cos\left(\sin^{-1}\left(\frac{1}{n_s}\sin\theta_a\right)\right)}{4(n_s^2 - \sin^2\theta_a)}, \text{ and}$$

if $n_i > n_s < n_g$ and $\theta_a$ is a value between or equal to one of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N + \frac{3}{4}\right)n_s\lambda\cos\left(\sin^{-1}\left(\frac{1}{n_s}\sin\theta_a\right)\right)}{4(n_s^2 - \sin^2\theta_a)} \leq$$

$$d \leq \frac{\left(2N + \frac{5}{4}\right)n_s\lambda\cos\left(\sin^{-1}\left(\frac{1}{n_s}\sin\theta_a\right)\right)}{4(n_s^2 - \sin^2\theta_a)}$$

If the transmission wave has a horizontal polarization component that is greater than or equal to a vertical polarization component thereof with respect to the reflection suppression layer, a relationship expressed by Formula 3 is satisfied.

If $n_i < n_s < n_g$, [Equation 3]

$$\frac{\left(2N + \frac{3}{4}\right)n_s\lambda\cos\left(\sin^{-1}\left(\frac{1}{n_s}\sin\theta_a\right)\right)}{4(n_s^2 - \sin^2\theta_a)} \leq$$

$$d \leq \frac{\left(2N + \frac{5}{4}\right)n_s\lambda\cos\left(\sin^{-1}\left(\frac{1}{n_s}\sin\theta_a\right)\right)}{4(n_s^2 - \sin^2\theta_a)}, \text{ and}$$

if $n_i > n_s < n_g$, $$\frac{\left(2N + \frac{7}{4}\right)n_s\lambda\cos\left(\sin^{-1}\left(\frac{1}{n_s}\sin\theta_a\right)\right)}{4(n_s^2 - \sin^2\theta_a)} \leq$$

$$d \leq \frac{\left(2N + \frac{9}{4}\right)n_s\lambda\cos\left(\sin^{-1}\left(\frac{1}{n_s}\sin\theta_a\right)\right)}{4(n_s^2 - \sin^2\theta_a)}$$

According to the present invention, it is possible to reduce loss of a transmission wave passing through the windshield.

These and other objects, features, aspects and advantages of the present invention will become more apparent from the following detailed description of the present invention when taken in conjunction with the accompanying drawings.

DESCRIPTION OF EMBODIMENTS

Figure 1:
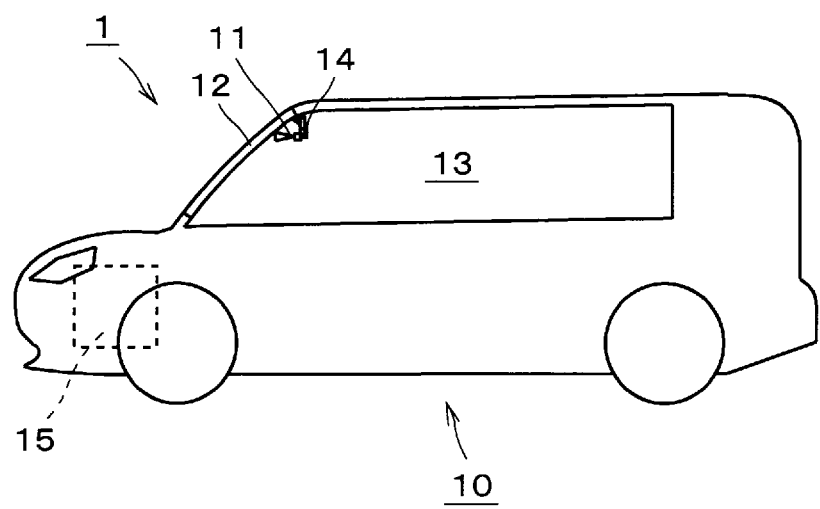
FIG. 1 is a simplified side view of a vehicle.

FIG. 1 is a simplified side view of a vehicle 1 according to an exemplary embodiment of the present invention. The vehicle 1 is a passenger car and includes an on-vehicle radar device 11 (hereinafter, referred to as a "radar device").

The radar device 11 is used for purposes such as collision avoidance, driving assistance, and automatic driving. The radar device 11 is mounted on the inner surface of a windshield 12 of the vehicle 1 and located in a vehicle interior 13. The vehicle interior 13 does not need to be a completely isolated space separated from the outside, and may be open-roofed, for example. The radar device 11 is located forward of a rear-view mirror 14 mounted on the windshield 12. The vehicle 1 includes a drive mechanism 15 for moving a vehicle body 10. The drive mechanism 15 includes, for example, an engine, a steering mechanism, a power transmission mechanism, and wheels.

The windshield 12 is fixed to the vehicle body 10 and located between the vehicle interior 13 and the outside. The windshield 12 is laminated glass in which a film is sandwiched between two sheets of glass. The radar device 11 is fixed to the inner surface of the windshield 12 either directly or indirectly via a mounting member, such as a bracket. As another form of mounting, the radar device 11 may be mounted on the rear-view mirror or the ceiling. In the present embodiment, the radar device 11 is indirectly fixed to the windshield 12 via a bracket.

Figure 2:
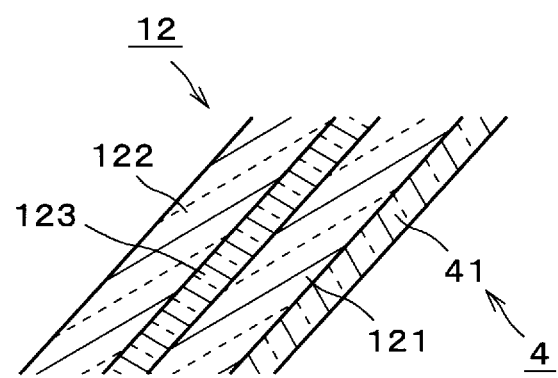
FIG. 2 is a cross-sectional view of a windshield.

As illustrated in FIG. 2, the windshield 12 includes an innermost glass layer 121, an outermost glass layer 122, and an intermediate resin layer 123. The intermediate resin layer 123 is sandwiched between the innermost glass layer 121 and the outermost glass layer 122. That is, the innermost glass layer 121, the intermediate resin layer 123, and the outermost glass layer 122 are arranged in this order when viewed from the vehicle interior 13. The windshield 12 may have other structures as long as the surface on the vehicle interior 13 side of the windshield 12 is a surface of a glass layer, i.e., at least the surface on the vehicle interior 13 side of the windshield 12 is a surface of a covering glass.

The windshield 12 has a reflection suppression layer 4 on the surface on the vehicle interior 13 side. The reflection suppression layer 4 includes a sheet-like dielectric layer 41. The details of the dielectric layer 41 will be described later. In the present embodiment, the innermost glass layer 121 and the outermost glass layer 122 are made of soda-lime glass. The innermost glass layer 121 and the outermost glass layer 122 may have the same optical properties, or may have different optical properties. The intermediate resin layer 123 is preferably made of polyvinyl butyrate (PVB). The intermediate resin layer 123 may include a plurality of resin layers stacked on top of one another.

Figure 3:
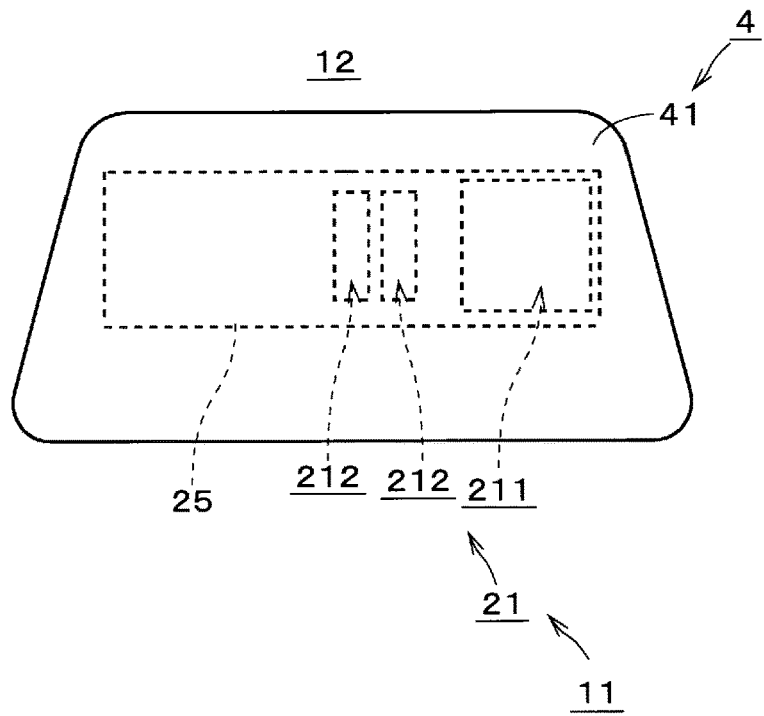
FIG. 3 is a front view of the windshield.
Figure 4:
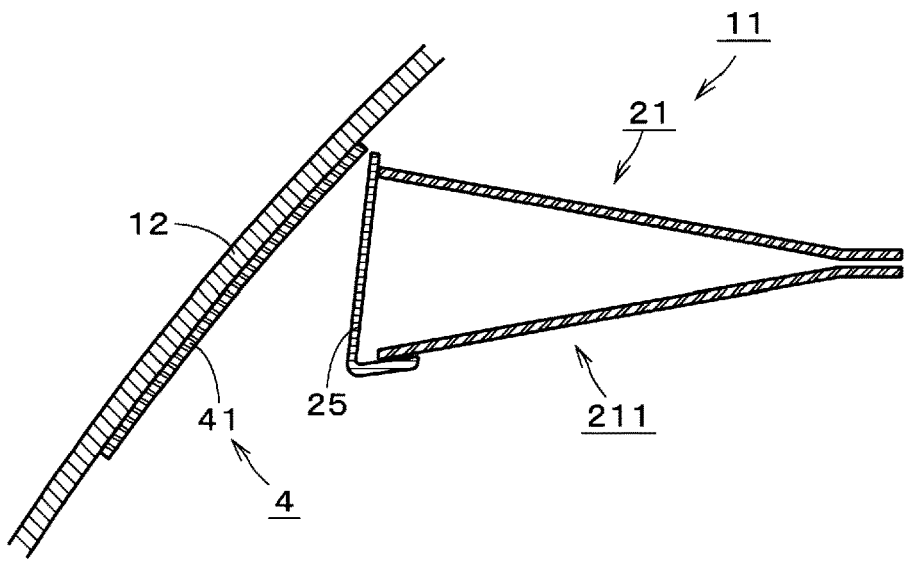
FIG. 4 is a cross-sectional view of a radar device, the windshield, and a reflection suppression layer.

FIGS. 3 and 4 illustrate part of the radar device 11 mounted on the windshield 12 and the reflection suppression layer 4. FIG. 3 illustrates the vehicle interior 13 as viewed from the front side of the windshield 12. FIG. 4 illustrates cross-sections of the radar device 11, the windshield 12, and the reflection suppression layer 4 that are approximately perpendicular to the windshield 12. In FIG. 4, the windshield 12 is illustrated as a single layer without distinguishing among the innermost glass layer 121, the intermediate resin layer 123, and the outermost glass layer 122.

The dielectric layer 41 is bonded to the surface on the vehicle interior 13 side of the windshield 12, i.e., the surface on an antenna part 21 (described later) side of the windshield 12, and closely adheres to that surface. The dielectric layer 41 covers only part of the windshield 12. The width of the dielectric layer 41 along the surface of the windshield 12 increases in the downward direction. The dielectric layer 41 is an amorphous resin sheet and made of, for example, denatured polyphenylene ether (PPE). The dielectric layer 41 may be made of other materials. The dielectric layer 41 is preferably transparent if the radar device 11 includes a camera. If there is no interference with the function of the radar device 11, the dielectric layer 41 may be opaque.

As described previously, the radar device 11 is fixed to the windshield 12 via a bracket (not shown). The radar device 11 is detachable from the bracket. The radar device 11 includes an antenna part 21 and an antenna cover 25. The antenna part 21 transmits a radio wave, which is a radar wave, from the vehicle interior 13 through the windshield 12 to the outside and receives a reflected wave that enter the vehicle interior 13 from the outside through the windshield 12.

The antenna part 21 includes a transmitting antenna 211 and a plurality of receiving antennas 212. The transmitting antenna 211 transmits a transmission wave that is a radio wave in the millimeter waveband. Each receiving antenna 212 receives a reflected wave resulting from the transmission wave. The transmitting antenna 211 and the receiving antennas 212 may be horn antennas. The transmitting antenna 211 and the receiving antennas 212 may also be antennas other than horn antennas. That is, the transmitting antenna 211 and the receiving antennas 212 may be any antennas that can transmit and receive millimeter waves. The transmitting antenna 211 is preferably disposed such that the direction of the center of the main lobe, i.e., the direction of the peak of the main lobe, is oriented in the horizontal direction. In the example in FIG. 3, the antenna part 21 includes two receiving antennas 212, but the antenna part 21 may include three or more receiving antennas 212. The antenna part 21 may also include a plurality of transmitting antennas 211. As another alternative, an antenna may serve as both a transmitting antenna and a receiving antenna.

In each horn antenna of the antenna part 21, constituents are electrically or spatially connected for transmitting and receiving signals in the order of a monolithic microwave integrated circuit (MMIC), a transmission line (specifically, a microstrip line, a transducer, and a waveguide), and a horn. Using the horn antenna allows gains to be secured while minimizing the width in the height direction of the antenna and allows the forward projection area of the radar device 11 to be reduced. Thus, the radar device 11 can be installed in the vicinity of the windshield without limiting the vision of passengers.

The antenna cover 25 is located between the windshield 12 and the antenna part 21 and covers the front of the antenna part 21. The antenna cover 25 is molded of a resin. The front surface, i.e., outer surface, of the antenna cover 25 is black in color. This prevents the antenna part 21 from standing out when viewed from the outside of the vehicle, and ensures the aesthetic appearance of the vehicle 1. The antenna cover 25 is also called a "Radome."

Figure 5:
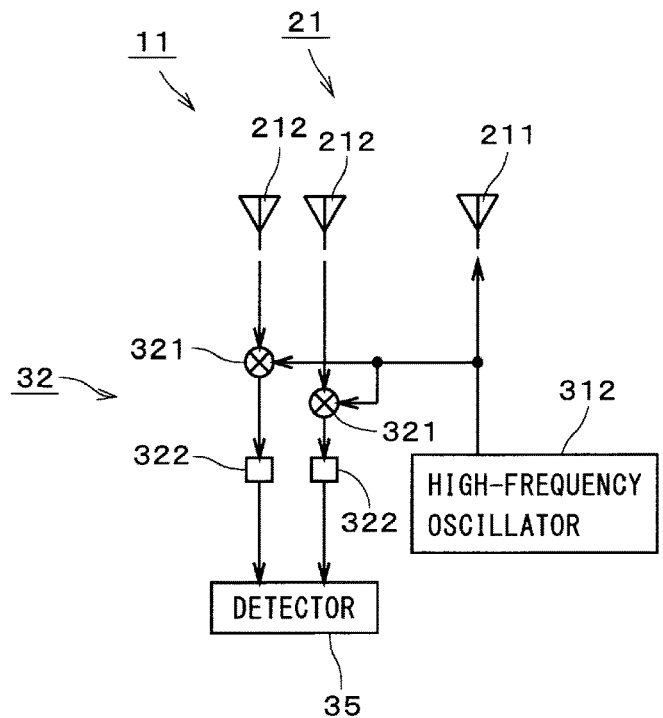
FIG. 5 is a block diagram illustrating an outline of a configuration of the radar device.

FIG. 5 is a block diagram illustrating an outline of a configuration of the radar device 11. The radar device 11 further includes a high-frequency oscillator 312, a receiver 32, and a detector 35. The receiver 32 includes mixers 321 and analog-to-digital (AD) converters 322. The transmitting antenna 211 is connected to the high-frequency oscillator 312. The high-frequency oscillator 312 outputs high-frequency electric power to the transmitting antenna 211, and accordingly the transmitting antenna 211 transmits a transmission wave. Here, the transmission wave has a vertical polarization component greater than a horizontal polarization component thereof with respect to the reflection suppression layer 4.

Each receiving antenna 212 is sequentially connected to a mixer 321 and an A/D converter 322. The A/D converters 322 are connected to the detector 35. Each receiving antenna 212 receives a reflected wave generated by reflection of a transmission wave on an object outside the vehicle. A radio wave signal received by the receiving antenna 212 is input to the mixer 321. The mixer 321 also receives input of a signal from the high-frequency oscillator 312 and combines these received signals to acquire a beat signal that indicates a difference in frequency between the transmission wave and the reflected wave. The beat signal is converted into a digital signal by the AD converter 322 and is output as a received signal to the detector 35. The detector 35 obtains, for example, the position and speed of the object by converting the beat signals through Fourier transformation and further performing arithmetic processing on the signals.

Figure 6:
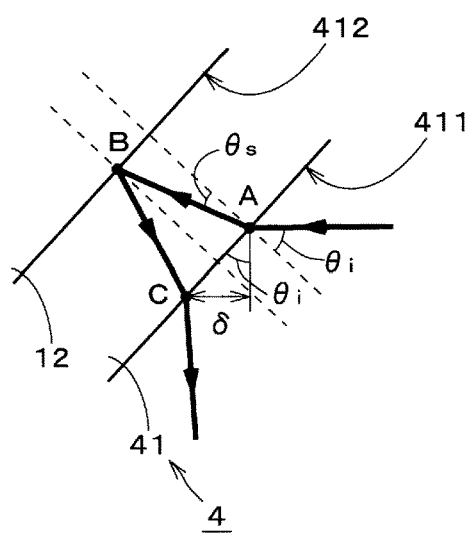
FIG. 6 illustrates a state in which a transmission wave enters the reflection suppression layer.

Next, the details of the reflection suppression layer 4 will be described. FIG. 6 illustrates a state in which a transmission wave enters the reflection suppression layer 4. Note that the incident angle of the transmission wave refers to the incident angle of the transmission wave on an object at the center of the main lobe of the transmitting antenna 211.

Here, the refractive index of the reflection suppression layer 4 in FIG. 6, i.e., the refractive index of the dielectric layer 41, is lower than the refractive index of the innermost glass layer 121 of the windshield 12 (see FIG. 2) and higher than the refractive index of the air. Thus, the reflectivity of a surface 411 on the antenna part 21 side of the dielectric layer 41 will be reduced to some extent, as compared to the reflectivity of the surface on the antenna part 21 side of the windshield 12 on the condition that no dielectric layer 41 is provided to the windshield 12. The refractive index of the dielectric layer 41 may be adjusted by introducing air bubbles or other materials.

As indicated by bold arrows in FIG. 6, the transmission wave that enters the dielectric layer 41 from a point A on the surface 411 is reflected at a point B on an interface 412 between the dielectric layer 41 and the windshield 12, and returns as a reflected wave to a point C on the surface 411 of the dielectric layer 41. At this time, if the reflected wave passing through the point C and the transmission wave that enters the point C on the surface 411 from the antenna part 21 side and is reflected thereon are opposite in phase (i.e., π out of phase with each other), they will cancel out each other. As a result, the reflection of the transmission wave on the surface 411 will be suppressed, the transmission wave being incident on and reflected off the surface 411, i.e., entering the surface 411 from a medium (hereinafter, referred to as an "adjacent layer") that is adjacent to the surface 411 of the dielectric layer 41. Likewise, the reflection of the transmission wave on the interface 412 will also be suppressed. In the example in FIG. 4, the adjacent layer is the air.

The following describes the dielectric layer 41 that suppresses reflection of a transmission wave by interference between a reflected wave generated by reflection of the transmission wave on the interface 412 and the transmission wave reflected on the surface 411 (i.e., a reflected wave generated by reflection of the transmission wave on the surface 411). In the following description, $\theta_i$ is the incident angle of the transmission wave on the dielectric layer 41, $n_s$ is the refractive index of the dielectric layer 41, $n_i$ is the refractive index of the adjacent layer, and $\theta_s$ is the refraction angle in the dielectric layer 41. Formula 4 holds true according to Snell's law.

$$\frac{\sin\theta_i}{\sin\theta_s} = \frac{n_s}{n_i} \qquad \text{[Formula 4]}$$

An optical path length $L_{abc}$ from the point A via the point B to the point C in the dielectric layer 41 is expressed by Formula 5, where d is the thickness of the dielectric layer 41.

$$L_{abc} = \frac{2dn_s}{\cos\theta_s} \qquad \text{[Formula 5]}$$

An optical path length $\delta$ between the point A and the point C in the travel direction of the transmission wave entering the dielectric layer 41 from the antenna part 21 is expressed by Formula 6.

$$\delta = 2dn_i \tan\theta_s \sin\theta_i \qquad \text{[Formula 6]}$$

The condition under which the reflected wave generated by reflection of the transmission wave on the interface 412 and the transmission wave reflected on the surface 411 will be opposite in phase on the surface 411 is expressed by Formula 7, where N is an integer of 0 or more, and $\lambda$ is the wavelength of the transmission wave in the air. Formula 7 is based on the assumption that the phases are inverted (i.e., the phases are shifted by $\pi$) by the reflection of the transmission wave on the point B and the reflection of the transmission wave that enters the point C from the adjacent layer, respectively.

$$L_{abc} = \frac{\lambda}{2}(2N+1) + \delta \qquad \text{[Formula 7]}$$

Transforming Formula 7 by using Formulas 4 to 6 yields Formula 8 that expresses the thickness d of the dielectric layer 41.

$$d = \frac{(2N+1)n_s\lambda\cos\left(\sin^{-1}\left(\frac{n_i}{n_s}\sin\theta_i\right)\right)}{4(n_s^2 - n_i^2\sin^2\theta_i)} \qquad \text{[Formula 8]}$$

If the phase shift between the reflected wave generated by reflection of the transmission wave on the interface 412 and the transmission wave reflected on the surface 411 is within a range of ($\pi \pm \pi/4$), it is considered possible to suppress the reflection of the transmission wave on the surface 411 of the dielectric layer 41. In this case, (2N+1) in Formula 7 is (2N+1±1/4). Accordingly, a preferable condition for the thickness d of the dielectric layer 41 corresponding to the incident angle $\theta_i$ of the transmission wave on the dielectric layer 41, i.e., the tilt angle of the windshield 12, is expressed by Formula 9.

$$\frac{\left(2N+\frac{3}{4}\right)n_s\lambda\cos\left(\sin^{-1}\left(\frac{n_i}{n_s}\sin\theta_i\right)\right)}{4(n_s^2 - n_i^2\sin^2\theta_i)} \leq \qquad \text{[Formula 9]}$$

$$d \leq \frac{\left(2N+\frac{5}{4}\right)n_s\lambda\cos\left(\sin^{-1}\left(\frac{n_i}{n_s}\sin\theta_i\right)\right)}{4(n_s^2 - n_i^2\sin^2\theta_i)}$$

The above condition is based on the assumption that the incident angle $\theta_i$ of the transmission wave on the dielectric layer 41 is less than or equal to a Brewster angle in the case where a radio wave enters the surface 411 of the dielectric layer 41 from the adjacent layer. As described previously, the transmission wave has a vertical polarization component greater than a horizontal polarization component thereof with respect to the reflection suppression layer 4. Thus, if the incident angle $\theta_i$ is greater than the Brewster angle, the influence of the phase inversion of the vertical polarization component reflected on the surface 411 will increase. In this case, the condition under which the reflected wave generated by reflection of the transmission wave on the interface 412 and the transmission wave reflected on the surface 411 will be opposite in phase on the surface 411 is expressed by Formula 10, and a preferable condition for the thickness d of the dielectric layer 41 is expressed by Formula 11. Note that the incident angle $\theta_s$ of the transmission wave passing through the dielectric layer 41 on the windshield 12 is assumed to be less than or equal to the Brewster angle on the interface 412.

$$L_{abc} = \lambda(N+1) + \delta \qquad \text{[Formula 10]}$$

$$\frac{\left(2N+\frac{7}{4}\right)n_s\lambda\cos\left(\sin^{-1}\left(\frac{n_i}{n_s}\sin\theta_i\right)\right)}{4(n_s^2 - n_i^2\sin^2\theta_i)} \leq \qquad \text{[Formula 11]}$$

$$d \leq \frac{\left(2N+\frac{9}{4}\right)n_s\lambda\cos\left(\sin^{-1}\left(\frac{n_i}{n_s}\sin\theta_i\right)\right)}{4(n_s^2 - n_i^2\sin^2\theta_i)}$$

Figure 7:
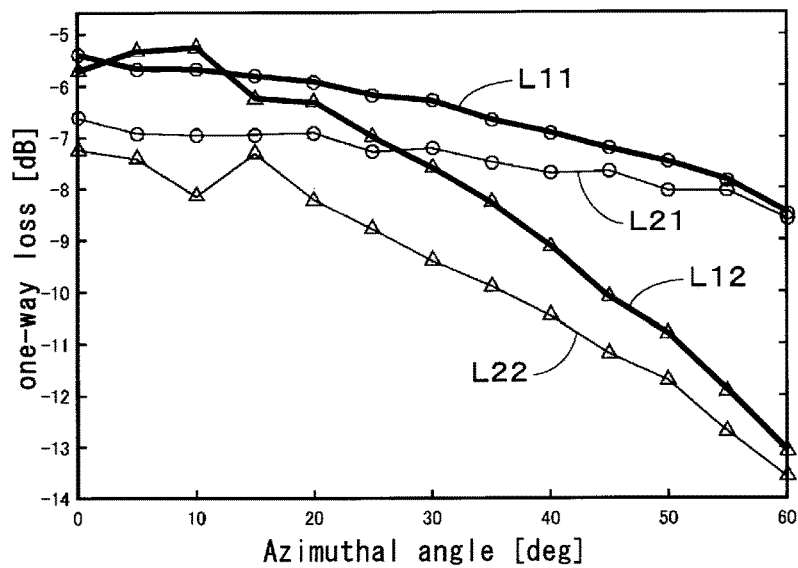
FIG. 7 illustrates the results of measuring loss of radio waves due to the presence of the windshield.

FIG. 7 illustrates the results of measuring loss of radio waves due to the presence of the windshield 12. The vertical axis in FIG. 7 indicates one-way loss of radio waves travelling through the windshield 12 to the outside, and the horizontal axis indicates the azimuthal angle. Bold lines L11 and L12 in FIG. 7 indicate loss due to the presence of the windshield 12 with the dielectric layer 41, and fine lines L21 and L22 indicate loss due to the presence of the windshield 12 without the dielectric layer 41. The lines L11 and L21 indicate the case where the incident angle is 55° when the azimuthal angle is 0°, and the lines L12 and L22 indicate the case where the incident angle is 85° when the azimuthal angle is 0°. Either incident angle is greater than the Brewster angle on the surface 411 of the dielectric layer 41, and the dielectric layer 41 has a thickness that satisfies the condition expressed by Formula 11.

As can be seen from FIG. 7, the presence of the dielectric layer 41 on the windshield 12 reduces loss. In actuality, loss increases as the incident angle changes with increasing azimuthal angle, but the presence of the dielectric layer 41 on the windshield 12 will suppress loss, regardless of the azimuthal angle. Alternatively, the thickness of the dielectric layer 41 may be gradually changed in accordance with the incident angle at each azimuthal angle. In this case, loss will be reduced considerably over the entire range of predetermined azimuthal angles. The front side of the radar device 11, i.e., when having an azimuthal angle of 0°, is required to have high sensitivity, whereas the sides thereof are not required to have such high sensitivity. From this viewpoint, there will be no problem if the dielectric layer 41 has a constant thickness.

As described above, the vehicle 1 includes the dielectric layer 41 located between the antenna part 21 and the windshield 12 and adhering to the surface of the windshield 12. The dielectric layer 41 has a refractive index that is lower than the refractive index of the innermost glass layer 121 of the windshield 12 and higher than the refractive index of the air. The dielectric layer 41 has a thickness that allows reflection of a transmission wave to be suppressed by interference between a reflected wave generated by reflection of the transmission wave on the interface 412 at which the dielectric layer 41 adheres to the surface of the windshield 12, and a reflected wave generated by reflection of the transmission wave on the surface 411. This structure will help reduce loss of the transmission wave passing through the windshield 12 and improve the efficiency of transmission and reception of radio waves.

The incident angle of the transmission wave on the reflection suppression layer 4 at the center of the main lobe of the transmitting antenna 211 is preferably greater than 10°. In other words, the windshield 12 may be inclined by a large amount with respect to the radiating surface of the transmitting antenna 211. Accordingly, it is possible to mount the radar device 11 on various parts of vehicles 1 in various designs.

The reflection suppression layer 4 may include additional dielectric layers that adhere to the surface 411 on the antenna part 21 side of the dielectric layer 41. In the example in FIG. 8, two dielectric layers 42 and 43 are stacked on top of each other on the surface 411 of the dielectric layer 41. Hereinafter, the dielectric layers 41, 42, and 43 are respectively referred to as an "outer dielectric layer 41," an "intermediate dielectric layer 42," and an "inner dielectric layer 43." The intermediate dielectric layer 42 adheres to the surface 411 on the antenna part 21 side of the outer dielectric layer 41. The refractive index of the intermediate dielectric layer 42 is preferably lower than the refractive index of the outer dielectric layer 41 and higher than the refractive index of the air. The inner dielectric layer 43 adheres to a surface 421 on the antenna part 21 side of the intermediate dielectric layer 42. The refractive index of the inner dielectric layer 43 is preferably lower than the refractive index of the intermediate dielectric layer 42 and higher than the refractive index of the air.

Figure 8:
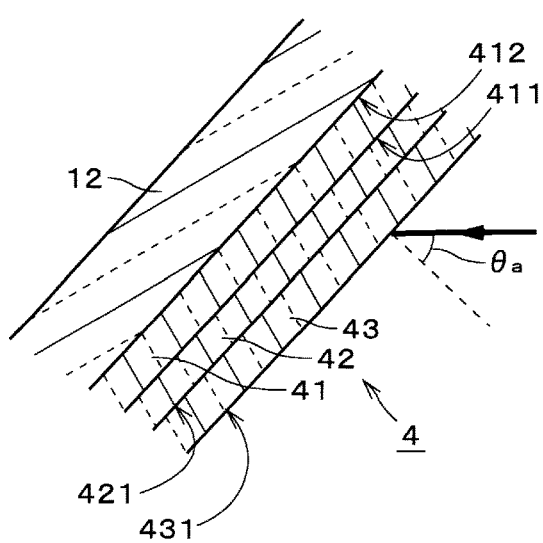
FIG. 8 is a cross-sectional view of a reflection suppression layer that includes a plurality of dielectric layers.

Referring now to the reflection suppression layer 4 in FIG. 8, the outer dielectric layer 41 that suppresses reflection of a transmission wave will be described. In the example in FIG. 8, the intermediate dielectric layer 42 serves as the adjacent layer having a refractive index $n_i$ (i.e., a medium adjacent to the outer dielectric layer 41 on the antenna part 21 side) in Formulas 9 and 11 described with reference to FIG. 6. According to Snell's law, ($n_i \sin \theta_i$) in Formulas 9 and 11 is ($\sin \theta_a$), where $\theta_a$ is the incident angle of the transmission wave entering the reflection suppression layer 4 from the air layer at the center of the main lobe of the transmitting antenna 211, and the air layer has a refractive index of 1. In the example in FIG. 8, $\theta_a$ is the incident angle of the transmission wave on a surface 431 of the inner dielectric layer 43.

A Brewster angle $\theta_{bi}$ in the case where a radio wave enters the outer dielectric layer 41 from the intermediate dielectric layer 42 is $(\tan^{-1}(n_s/n_i))$, where $n_s$ is the refractive index of the outer dielectric layer 41. The incident angle $\theta_a$ on the reflection suppression layer 4 at this time is expressed by Formula 12.

$$\sin^{-1}\left(n_i \sin\left(\tan^{-1}\frac{n_s}{n_i}\right)\right) \quad \text{[Formula 12]}$$

The Brewster angle $\theta_{bs}$ in the case where a radio wave enters the windshield 12 from the outer dielectric layer 41 is $(\tan^{-1}(n_g/n_s))$, where $n_g$ is the refractive index of the glass of the windshield 12. At this time, the incident angle $\theta_a$ on the reflection suppression layer 4 is expressed by Formula 13.

$$\sin^{-1}\left(n_s \sin\left(\tan^{-1}\frac{n_g}{n_s}\right)\right) \quad \text{[Formula 13]}$$

If the incident angle $\theta_a$ on the reflection suppression layer 4 is smaller than both of the angles given by Formulas 12 and 13, both of the reflected wave generated by reflection of the transmission wave on the interface 412 and the transmission wave reflected on the surface 411 will not undergo a phase inversion due to the relationship with the Brewster angles $\theta_{bi}$ and $\theta_{bs}$. If the incident angle $\theta_a$ is greater than both of the angles given by Formulas 12 and 13, both of the reflected wave generated by reflection of the transmission wave on the interface 412 and the transmission wave reflected on the surface 411 will undergo a phase inversion due to the relationship with the Brewster angles $\theta_{bi}$ and $\theta_{bs}$. If the incident angle $\theta_a$ is a value between or equal to one of the angles given by Formulas 12 and 13, only one of the reflected wave generated by reflection of the transmission wave on the interface 412 and the transmission wave reflected on the surface 411 will undergo a phase inversion due to the relationship with the Brewster angles $\theta_{bi}$ and $\theta_{bs}$.

If the refractive index $n_s$ of the outer dielectric layer 41 is higher than the refractive index $n_i$ of the intermediate dielectric layer 42, the transmission wave reflected on the surface 411 will undergo a phase inversion due to a difference in the refractive index. Accordingly, the reflection of the transmission wave on the surface 411 of the outer dielectric layer 41 will be suppressed if the thickness d of the outer dielectric layer 41 satisfies the relationships expressed by Formulas 14 and 15.

If $n_i < n_s <$ [Formula 14]

$n_g$ and $\theta_a$ is smaller than or greater than both of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N + \frac{3}{4}\right)n_s \lambda \cos\left(\sin^{-1}\left(\frac{1}{n_s}\sin\theta_a\right)\right)}{4(n_s^2 - \sin^2\theta_a)} \le$$

$$d \le \frac{\left(2N + \frac{5}{4}\right)n_s \lambda \cos\left(\sin^{-1}\left(\frac{1}{n_s}\sin\theta_a\right)\right)}{4(n_s^2 - \sin^2\theta_a)}, \text{ and}$$

if $n_i < n_s < n_g$ and $\theta_a$ is a value between or equal to one of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N + \frac{7}{4}\right)n_s \lambda \cos\left(\sin^{-1}\left(\frac{1}{n_s}\sin\theta_a\right)\right)}{4(n_s^2 - \sin^2\theta_a)} \le$$

$$d \le \frac{\left(2N + \frac{9}{4}\right)n_s \lambda \cos\left(\sin^{-1}\left(\frac{1}{n_s}\sin\theta_a\right)\right)}{4(n_s^2 - \sin^2\theta_a)}$$

-continued

If $n_i < n_s <$ [Formula 15]

$n_g$ and $\theta_a$ is smaller than or greater than both of $$\sin^{-1}\left(n_i\sin\left(\tan^{-1}\frac{n_s}{n_i}\right)\right) \text{ and } \sin^{-1}\left(n_s\sin\left(\tan^{-1}\frac{n_g}{n_s}\right)\right),$$

$$\frac{\left(2N+\frac{7}{4}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{9}{4}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i < n_s < n_g$ and $\theta_a$ is a value between or equal to one of $$\sin^{-1}\left(n_i\sin\left(\tan^{-1}\frac{n_s}{n_i}\right)\right) \text{ and } \sin^{-1}\left(n_s\sin\left(\tan^{-1}\frac{n_g}{n_s}\right)\right),$$

$$\frac{\left(2N+\frac{3}{4}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{5}{4}\right)n_s\lambda\cos\left(\sin^{-1}\left(\frac{1}{n_s}\sin\theta_a\right)\right)}{4(n_s^2-\sin^2\theta_a)}$$

If the phase shift between the reflected wave generated by reflection of the transmission wave on the interface 412 and the transmission wave reflected on the surface 411 is within a range of ($\pi\pm\pi/6$), the reflection of the transmission wave will more reliably be suppressed. In this case, Formulas 14 and 15 are respectively expressed by Formulas 16 and 17.

If $n_i < n_s <$ [Formula 16]

$n_g$ and $\theta_a$ is smaller than or greater than both of $$\sin^{-1}\left(n_i\sin\left(\tan^{-1}\frac{n_s}{n_i}\right)\right) \text{ and } \sin^{-1}\left(n_s\sin\left(\tan^{-1}\frac{n_g}{n_s}\right)\right),$$

$$\frac{\left(2N+\frac{5}{6}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{7}{6}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i < n_s < n_g$ and $\theta_a$ is a value between or equal to one of $$\sin^{-1}\left(n_i\sin\left(\tan^{-1}\frac{n_s}{n_i}\right)\right) \text{ and } \sin^{-1}\left(n_s\sin\left(\tan^{-1}\frac{n_g}{n_s}\right)\right),$$

$$\frac{\left(2N+\frac{11}{6}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{13}{6}\right)n_s\lambda\cos\left(\sin^{-1}\left(\frac{1}{n_s}\sin\theta_a\right)\right)}{4(n_s^2-\sin^2\theta_a)}$$

If $n_i < n_s <$ [Formula 17]

$n_g$ and $\theta_a$ is smaller than or greater than both of $$\sin^{-1}\left(n_i\sin\left(\tan^{-1}\frac{n_s}{n_i}\right)\right) \text{ and } \sin^{-1}\left(n_s\sin\left(\tan^{-1}\frac{n_g}{n_s}\right)\right),$$

$$\frac{\left(2N+\frac{11}{6}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{13}{6}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i < n_s < n_g$ and $\theta_a$ is a value between or equal to one of $$\sin^{-1}\left(n_i\sin\left(\tan^{-1}\frac{n_s}{n_i}\right)\right) \text{ and } \sin^{-1}\left(n_s\sin\left(\tan^{-1}\frac{n_g}{n_s}\right)\right),$$

$$\frac{\left(2N+\frac{5}{6}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{7}{6}\right)n_s\lambda\cos\left(\sin^{-1}\left(\frac{1}{n_s}\sin\theta_a\right)\right)}{4(n_s^2-\sin^2\theta_a)}$$

Next is a description of the intermediate dielectric layer 42 that suppresses reflection of a transmission wave. The reflection of the transmission wave is suppressed by interference between a reflected wave generated by reflection of the transmission wave on an interface (hereinafter, also referred to as an "interface 411") at which the intermediate dielectric layer 42 adheres to the surface 411 of the outer dielectric layer 41, and the transmission wave reflected on the surface 421 of the intermediate dielectric layer 42 (i.e., reflected wave generated by reflection of the transmission wave on the surface 421). In this regard, the intermediate dielectric layer 42 is as described above.

A Brewster angle $\theta_{bi2}$ in the case where a radio wave enters the intermediate dielectric layer 42 from the inner dielectric layer 43 is given by $(\tan^{-1}(n_i/n_{i2}))$, where $n_{i2}$ is the refractive index of a medium that is adjacent to the intermediate dielectric layer 42 (i.e., the inner dielectric layer 43) on the antenna part 21 side. At this time, the incident angle $\theta_a$ on the reflection suppression layer 4 is expressed by Formula 18.

$$\sin^{-1}\left(n_{i2}\sin\left(\tan^{-1}\frac{n_i}{n_{i2}}\right)\right) \qquad \text{[Formula 18]}$$

A Brewster angle $\theta_{bi}$ in the case where a radio wave enters the outer dielectric layer 41 from the intermediate dielectric layer 42 is given by $(\tan^{-1}(n_s/n_i))$. At this time, the incident angle $\theta_a$ on the reflection suppression layer 4 is expressed by Formula 19.

$$\sin^{-1}\left(n_i\sin\left(\tan^{-1}\frac{n_s}{n_i}\right)\right) \qquad \text{[Formula 19]}$$

If the incident angle $\theta_a$ on the reflection suppression layer 4 is smaller than both of the angles given by Formulas 18 and 19, both of the reflected wave generated by reflection of the transmission wave on the interface 411 and the transmission wave reflected on the surface 421 will not undergo a phase inversion due to the relationship with the Brewster angles $\theta_{bi2}$ and $\theta_{bi}$. If the incident angle $\theta_a$ is greater than both of the angles given by Formulas 18 and 19, both of the reflected wave generated by reflection of the transmission wave on the interface 411 and the transmission wave reflected on the surface 421 will undergo a phase inversion due to the relationship with the Brewster angles $\theta_{bi2}$ and $\theta_{bi}$. If the incident angle $\theta_a$ is a value between or equal to one of the angles given by Formulas 18 and 19, only one of the reflected wave generated by reflection of the transmission wave on the interface 411 and the transmission wave reflected on the surface 421 will undergo a phase inversion due to the relationship with the Brewster angles $\theta_{bi2}$ and $\theta_{bi}$.

If the refractive index $n_s$ of the outer dielectric layer 41 is higher than the refractive index $n_i$ of the intermediate dielectric layer 42, the reflected wave generated by reflection of the transmission wave on the interface 411 will undergo a phase inversion due to a difference in the refractive index. If the refractive index $n_i$ of the intermediate dielectric layer 42 is higher than the refractive index $n_{i2}$ of the inner dielectric layer 43, the transmission wave reflected on the surface 421 will undergo a phase inversion due to a difference in the refractive index. Accordingly, the reflection of the transmission wave on the surface 421 of the intermediate dielectric layer 42 will be suppressed if the thickness $d_i$ of the intermediate dielectric layer 42 satisfies the relationships expressed by Formulas 20 and 21.

If $n_{i2} > n_i > n_s$ or $n_{i2} < n_i <$ [Formula 20]
$n_s$ and $\theta_a$ is smaller than or greater than both of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{3}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{5}{4}\right)n_i\lambda\cos\left(\sin^{-1}\left(\frac{1}{n_i}\sin\theta_a\right)\right)}{4(n_i^2-\sin^2\theta_a)}, \text{ and}$$

if $n_{i2} > n_i > n_s$ or $n_{i2} < n_i <$
$n_s$ and $\theta_a$ is a value between or equal to one of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{7}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{9}{4}\right)n_i\lambda\cos\left(\sin^{-1}\left(\frac{1}{n_i}\sin\theta_a\right)\right)}{4(n_i^2-\sin^2\theta_a)}$$

If $n_{i2} < n_i > n_s$ or $n_{i2} > n_i <$ [Formula 21]
$n_s$ and $\theta_a$ is smaller than or greater than both of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{7}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{9}{4}\right)n_i\lambda\cos\left(\sin^{-1}\left(\frac{1}{n_i}\sin\theta_a\right)\right)}{4(n_i^2-\sin^2\theta_a)}, \text{ and}$$

if $n_{i2} < n_i > n_s$ or $n_{i2} > n_i <$
$n_s$ and $\theta_a$ is a value between or equal to one of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{3}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{5}{4}\right)n_i\lambda\cos\left(\sin^{-1}\left(\frac{1}{n_i}\sin\theta_a\right)\right)}{4(n_i^2-\sin^2\theta_a)}$$

If the phase shift between the reflected wave generated by reflection of the transmission wave on the interface 411 and the transmission wave reflected on the surface 421 is within a range of $(\pi\pm\pi n/6)$, the intermediate dielectric layer 42 will more reliably suppress the reflection of the transmission wave.

A preferable condition for the thickness of the dielectric layer described above is based on the assumption that the transmission wave has a vertical polarization component greater than a horizontal polarization component thereof with respect to the reflection suppression layer 4. If the transmission wave has a horizontal polarization component greater than or equal to a vertical polarization component thereof with respect to the reflection suppression layer 4, the influence of the phase inversion due to the relationship with the Brewster angles will decrease. Accordingly, the reflection of the transmission wave on the surface 411 of the outer dielectric layer 41 will be suppressed if the thickness d of the outer dielectric layer 41 satisfies the relationship expressed by Formula 22.

If $n_i < n_s < n_g$, [Formula 22]

$$\frac{\left(2N+\frac{3}{4}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{5}{4}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i > n_s < n_g$, $$\frac{\left(2N+\frac{7}{4}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{9}{4}\right)n_i\lambda\cos\left(\sin^{-1}\left(\frac{1}{n_i}\sin\theta_a\right)\right)}{4(n_i^2-\sin^2\theta_a)}.$$

Similarly, the reflection of the transmission wave on the surface 421 of the intermediate dielectric layer 42 will be suppressed if the thickness $d_i$ of the intermediate dielectric layer 42 satisfies the relationship expressed by Formula 23.

If $n_{i2} > n_i > n_s$ or $n_{i2} < n_i < n_s$, [Formula 23]

$$\frac{\left(2N+\frac{3}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{5}{4}\right)n_i\lambda\cos\left(\sin^{-1}\left(\frac{1}{n_i}\sin\theta_a\right)\right)}{4(n_i^2-\sin^2\theta_a)}, \text{ and}$$

if $n_{i2} < n_i > n_s$ or $n_{i2} > n_i < n_s$, $$\frac{\left(2N+\frac{7}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{9}{4}\right)n_i\lambda\cos\left(\sin^{-1}\left(\frac{1}{n_i}\sin\theta_a\right)\right)}{4(n_i^2-\sin^2\theta_a)}.$$

The thickness of the inner dielectric layer 43 also preferably satisfies the relationship according to Formulas 20 and 21 or Formula 23. The inner dielectric layer 43 may be omitted from the reflection suppression layer 4. In this case, the air layer serves as the medium adjacent to the intermediate dielectric layer 42 on the antenna part 21 side, and the refractive index $n_{i2}$ becomes 1. As another alternative, the reflection suppression layer 4 may include four or more dielectric layers. If the reflection suppression layer 4 includes a plurality of dielectric layers, the refractive indices of all dielectric layers are preferably smaller than the refractive index of the glass of the windshield 12 and greater than the refractive index of the air. Additionally, the refractive indices of these dielectric layers are preferably set such that the dielectric layers located closer to the antenna part 21 have smaller refractive indices.

Figure 9:
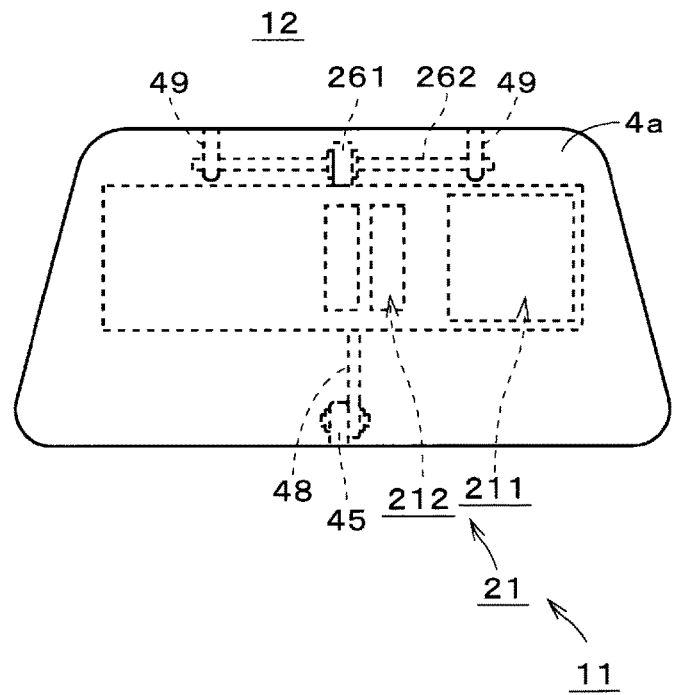
FIG. 9 is a front view showing another example of the reflection suppression layer.
Figure 10:
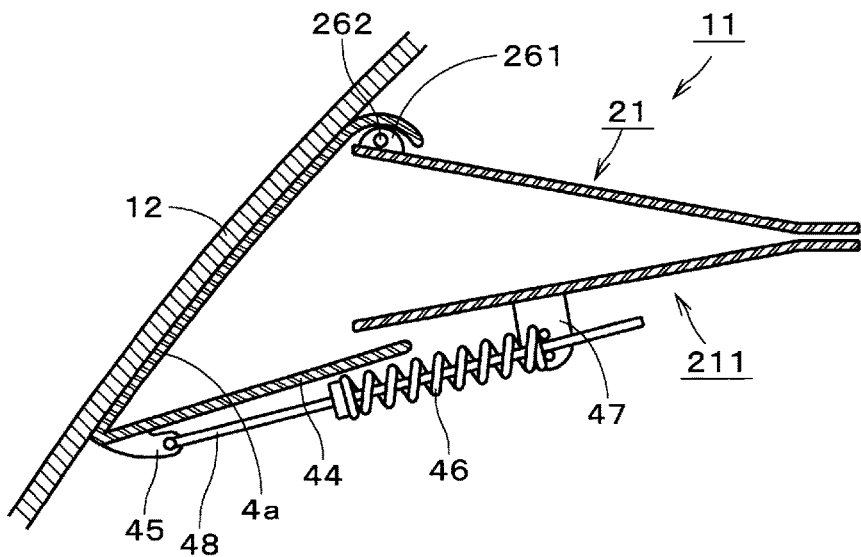
FIG. 10 is a cross-sectional view showing the reflection suppression layer.

FIGS. 9 and 10 show another example of the reflection suppression layer, namely, a reflection suppression layer 4a, and illustrate part of the radar device 11 mounted on the windshield 12 and the reflection suppression layer 4a. FIGS. 9 and 10 correspond respectively to FIGS. 3 and 4.

The reflection suppression layer 4a includes at least one dielectric layer and has a plate-like shape. The reflection suppression layer 4a is located between the antenna part 21 and the windshield 12 and covers the front of the opening of the antenna part 21. The reflection suppression layer 4a also serves as an antenna cover of the radar device 11. In other words, the antenna cover also serves as the reflection suppression layer 4a. Hereinafter, the reflection suppression layer 4a is referred to as a "dielectric cover 4a." A dielectric layer(s) of the dielectric cover 4a may be made of an ABS resin, a polycarbonate resin, a syndiotactic polystyrene resin or the like. The dielectric cover 4a has flexibility.

The dielectric cover 4a has two bearings 49. The two bearings 49 are fixed at the upper part to the surface on the antenna part 21 side of the dielectric cover 4a. The antenna part 21 has one bearing 261. The bearing 261 is provided at the upper part of the antenna part 21. The bearing 261 is located between the two bearings 49, which are arranged approximately in the horizontal direction. The two bearings 49 and the one bearing 2612 share one shaft 262. Thus, the upper part of the dielectric cover 4a is rotatably supported on the upper part of the antenna part 21. For example, the angle of the dielectric cover 4a relative to the antenna part 21 may vary within a range of approximately ±10°. In actuality, the bearing 261 is arranged at a position that is in close proximity to the windshield 12, and the shaft 262 applies pressure toward the windshield 12 to the top part of the dielectric cover 4a.

The dielectric cover 4a includes a lower cover 44 and a rod 48. The lower cover 44 extends toward the bottom of the antenna part 21. The lower cover 44 includes a bearing 45. The bearing 45 is connected to one end of the rod 48. The bearing 45 rotatably supports the rod 48. The rod 48 is inserted in a coil spring 46. One end on the bearing 45 side of the coil spring 46 is fixed to the rod 48. The other end of the coil spring 46 is in contact with a supporter 47 provided on the bottom of the antenna part 21. The coil spring 46 applies pressure toward the windshield 12 to the bottom of the dielectric cover 4a. As a result, the dielectric cover 4a is brought into intimate contact with the surface on the antenna part 21 side of the windshield 12, while being bent.

A dielectric layer of the dielectric cover 4a that adheres to the surface on the antenna part 21 side of the windshield 12 has a thickness that allows reflection of a transmission wave to be suppressed by interference between the reflected wave generated by reflection of the transmission wave on an interface at which the dielectric layer adheres to the surface of the windshield 12, and the reflected wave generated by reflection of the transmission wave on the surface on the antenna part 21 side of the dielectric layer. In other words, the thickness of the dielectric layer satisfies the relationships expressed by Formulas 14 and 15 if the transmission wave has a vertical polarization component greater than a horizontal polarization component thereof with respect to the dielectric cover 4a. If the transmission wave has a horizontal polarization component greater than or equal to a vertical polarization thereof component with respect to the dielectric cover 4a, the thickness of the dielectric layer satisfies the relationship expressed by Formula 22. As a result, this structure will help reduce loss of the transmission wave passing through the windshield 12 and improve the efficiency of transmission and reception of radio waves. If the dielectric cover 4a includes a plurality of dielectric layers, the thickness(es) of dielectric layer(s) other than the dielectric layer adhering to the windshield 12 preferably satisfies a relationship similar to that in the case of the intermediate dielectric layer 42 in FIG. 8.

As the inventors of the present invention have deduced from the observation of electromagnetic waves in the millimeter waveband, the refractive indices of electromagnetic waves in the millimeter waveband differ greatly from those in the other frequency bands. Thus, the refractive indices of radio waves in the millimeter waveband have to be used to evaluate the formulas described above. The "radio waves in the millimeter waveband" as used herein refer to radio waves having wavelengths of 1 mm to 10 mm in the air.

The vehicle 1 described above may be modified in various ways.

An object on which the radar device 11 is mounted is not limited to the windshield, and the radar device 11 may be mounted on a rear glass for the purpose of rearward monitoring. The installation position of the radar device is not limited to a position on glass.

The radar device 11 transmits a transmission wave in approximately the horizontal direction and receives a reflective wave that are returned in approximately the horizontal direction. Thus, a similar reflection suppression layer may also be provided on the outer surface of the windshield 12.

The vehicle 1 is not limited to a passenger car and may be other vehicles, such as a truck or a train, for use in various applications. The vehicle 1 is not limited to a man-driven vehicle, and may be an unattended vehicle such as an automated guided vehicle used in a factory.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2016-008157 filed in the Japan Patent Office on Jan. 19, 2016, the entire disclosure of which is incorporated herein by reference.

INDUSTRIAL AVAILABILITY

The vehicle according to the present invention can be used for various applications.

REFERENCE SIGNS LIST

1 Vehicle
4 Reflection suppression layer
4a Dielectric cover
10 Vehicle body
12 Windshield
13 Vehicle interior
15 Drive mechanism
21 Antenna part
32 Receiver 41 to 43 Dielectric layer
121 Innermost glass layer
211 Transmitting antenna
312 High-frequency oscillator

The invention claimed is:

1. A vehicle comprising:
a vehicle body;
a drive mechanism for moving the vehicle body;
a windshield located between a vehicle interior and an outside, at least a surface on the vehicle interior side of the windshield being a surface of glass;
an antenna part provided in the vehicle interior and for transmitting a transmission wave from the vehicle interior through the windshield to the outside, the transmission wave being a radio wave in a millimeter waveband, and receiving a reflected wave that enters the vehicle interior from the outside through the windshield;
a reflection suppression layer including a dielectric layer that adheres to the surface on the antenna part side of the windshield;
a high-frequency oscillator for outputting high-frequency electric power to the antenna part; and
a receiver for receiving input of a radio wave received by the antenna part and outputting a received signal;
wherein the dielectric layer has a refractive index that is lower than a refractive index of the glass and higher than a refractive index of air; and
the dielectric layer has a thickness that allows reflection of the transmission wave to be suppressed by interference between a reflected wave generated by reflection of the transmission wave on an interface at which the dielectric layer adheres to the surface of the windshield, and a reflected wave generated by reflection of the transmission wave on a surface on the antenna part side of the dielectric layer.

2. The vehicle according to claim 1, wherein
the reflection suppression layer includes another dielectric layer that adheres to the surface on the antenna part side of the dielectric layer; and
the another dielectric layer has a thickness that allows reflection of the transmission wave to be suppressed by interference between a reflected wave generated by reflection of the transmission wave on an interface at which the another dielectric layer adheres to the surface of the dielectric layer, and a reflected wave generated by reflection of the transmission wave on a surface on the antenna part side of the another dielectric layer.

3. A vehicle comprising:
a vehicle body;
a drive mechanism for moving the vehicle body;
a windshield located between a vehicle interior and an outside, at least a surface on the vehicle interior side of the windshield being a surface of glass;
an antenna part provided in the vehicle interior and for transmitting a transmission wave from the vehicle interior through the windshield to the outside, the transmission wave being a radio wave in a millimeter waveband, and receiving a reflected wave that enters the vehicle interior from the outside through the windshield;
a reflection suppression layer including a dielectric layer that adheres to the surface on the antenna part side of the glass;
a high-frequency oscillator for outputting high-frequency electric power to the antenna part; and
a receiver for receiving input of a radio wave received by the antenna part and outputting a received signal;
wherein the dielectric layer has a refractive index that is lower than a refractive index of the glass and higher than a refractive index of air;
the antenna part includes a transmitting antenna for transmitting the transmission wave;
the transmission wave has a vertical polarization component greater than a horizontal polarization component thereof with respect to the reflection suppression layer; and
relationships expressed by Formulas 24 and 25 are satisfied, where $\theta_a$ is an incident angle of the transmission wave on the reflection suppression layer at a center of a main lobe of the transmitting antenna, $n_s$ is the refractive index of the dielectric layer, $n_g$ is the refractive index of the glass, $n_i$ is a refractive index of a medium that is adjacent to the dielectric layer on the antenna part side, $\lambda$ is a wavelength of the transmission wave in air, N is an integer of 0 or more, and d is a thickness of the dielectric layer:

If $n_i < n_s <$ [Formula 24]

$n_g$ and $\theta_a$ is smaller than or greater than both of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N+\frac{3}{4}\right)n_s\lambda\cos\left(\sin^{-1}\left(\frac{1}{n_s}\sin\theta_a\right)\right)}{4(n_s^2-\sin^2\theta_a)} \le$$

$$d \le \frac{\left(2N+\frac{5}{4}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i < n_i < n_g$ and $\theta_a$ is a value between or equal to one of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N+\frac{7}{4}\right)n_s\lambda\cos\left(\sin^{-1}\left(\frac{1}{n_s}\sin\theta_a\right)\right)}{4(n_s^2-\sin^2\theta_a)} \le$$

$$d \le \frac{\left(2N+\frac{9}{4}\right)n_s\lambda\cos\left(\sin^{-1}\left(\frac{1}{n_s}\sin\theta_a\right)\right)}{4(n_s^2-\sin^2\theta_a)}$$

and

If $n_i > n_s <$ [Formula 25]

$n_g$ and $\theta_a$ is smaller than or greater than both of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N+\frac{7}{4}\right)n_s\lambda\cos\left(\sin^{-1}\left(\frac{1}{n_s}\sin\theta_a\right)\right)}{4(n_s^2-\sin^2\theta_a)} \le d \le$$

$$\frac{\left(2N+\frac{9}{4}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i > n_i < n_g$ and $\theta_a$ is a value between or equal to one of $\sin^{-1}\left(n_i \sin\left(\tan^{-1}\frac{n_s}{n_i}\right)\right)$ and $\sin^{-1}\left(n_s \sin\left(\tan^{-1}\frac{n_g}{n_s}\right)\right)$, $$\frac{\left(2N+\frac{3}{4}\right)n_s\lambda\cos\left(\sin^{-1}\left(\frac{1}{n_s}\sin\theta_a\right)\right)}{4(n_s^2-\sin^2\theta_a)} \le$$

$$d \le \frac{\left(2N+\frac{5}{4}\right)n_s\lambda\cos\left(\sin^{-1}\left(\frac{1}{n_s}\sin\theta_a\right)\right)}{4(n_s^2-\sin^2\theta_a)}.$$

4. The vehicle according to claim 3, wherein
the reflection suppression layer includes another dielectric layer that adheres to a surface on the antenna part side of the dielectric layer, and
relationships expressed by Formulas 26 and 27 are satisfied, where $n_i$ is a refractive index of the another dielectric layer, $n_{i2}$ is a refractive index of a medium that is adjacent to the another dielectric layer on the antenna part side, and $d_i$ is a thickness of the another dielectric layer:

If $n_{i2} > n_i > n_s$ or $n_{i2} < n_i <$ [Formula 26]
$n_s$ and $\theta_a$ is smaller than or greater than both of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{3}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{5}{4}\right)n_i\lambda\cos\left(\sin^{-1}\left(\frac{1}{n_i}\sin\theta_a\right)\right)}{4(n_i^2-\sin^2\theta_a)}, \text{ and}$$

if $n_{i2} > n_i > n_s$ or $n_{i2} < n_i <$
$n_s$ and $\theta_a$ is a value between or equal to one of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{7}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{9}{4}\right)n_i\lambda\cos\left(\sin^{-1}\left(\frac{1}{n_i}\sin\theta_a\right)\right)}{4(n_i^2-\sin^2\theta_a)}$$

and

If $n_{i2} < n_i > n_s$ or $n_{i2} > n_i <$ [Formula 27]
$n_s$ and $\theta_a$ is smaller than or greater than both of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{7}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{9}{4}\right)n_i\lambda\cos\left(\sin^{-1}\left(\frac{1}{n_i}\sin\theta_a\right)\right)}{4(n_i^2-\sin^2\theta_a)}, \text{ and}$$

if $n_{i2} < n_i > n_s$ or $n_{i2} > n_i <$
$n_s$ and $\theta_a$ is a value between or equal to one of
$\sin^{-1}\left(n_{i2}\sin\left(\tan^{-1}\frac{n_i}{n_{i2}}\right)\right)$ and $\sin^{-1}\left(n_i\sin\left(\tan^{-1}\frac{n_s}{n_i}\right)\right)$, $$\frac{\left(2N+\frac{3}{4}\right)n_i\lambda\cos\left(\sin^{-1}\left(\frac{1}{n_i}\sin\theta_a\right)\right)}{4(n_i^2-\sin^2\theta_a)} \leq$$

$$d_i \leq \frac{\left(2N+\frac{5}{4}\right)n_i\lambda\cos\left(\sin^{-1}\left(\frac{1}{n_i}\sin\theta_a\right)\right)}{4(n_i^2-\sin^2\theta_a)}.$$

5. A vehicle comprising:
a vehicle body;
a drive mechanism for moving the vehicle body;
a windshield located between a vehicle interior and an outside, at least a surface on the vehicle interior side of the windshield being a surface of glass;
an antenna part provided in the vehicle interior and for transmitting a transmission wave from the vehicle interior through the windshield to the outside, the transmission wave being a radio wave in a millimeter waveband, and receiving a reflected wave that enters the vehicle interior from the outside through the windshield;
a reflection suppression layer including a dielectric layer that adheres to the surface on the antenna part side of the glass;
a high-frequency oscillator for outputting high-frequency electric power to the antenna part; and
a receiver for receiving input of a radio wave received by the antenna part and outputting a received signal;
wherein the dielectric layer has a refractive index that is lower than a refractive index of the glass and higher than a refractive index of air;
the antenna part includes a transmitting antenna for transmitting the transmission wave;
the transmission wave has a horizontal polarization component greater than or equal to a vertical polarization component thereof with respect to the reflection suppression layer; and
a relationship expressed by Formula 28 is satisfied, where $\theta_a$ is an incident angle of the transmission wave on the reflection suppression layer at a center of a main lobe of the transmitting antenna, $n_s$ is the refractive index of the dielectric layer, $n_g$ is the refractive index of the glass, $n_i$ is a refractive index of a medium that is adjacent to the dielectric layer on the antenna part side, $\lambda$ is a wavelength of the transmission wave in air, N is an integer of 0 or more, and d is a thickness of the dielectric layer:

If $n_i < n_s < n_g$, [Formula 28]

$$\frac{\left(2N+\frac{3}{4}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{5}{4}\right)n_s\lambda\cos\left(\sin^{-1}\left(\frac{1}{n_s}\sin\theta_a\right)\right)}{4(n_s^2-\sin^2\theta_a)}, \text{ and}$$

if $n_i > n_s < n_g$, $$\frac{\left(2N+\frac{7}{4}\right)n_s\lambda\cos\left(\sin^{-1}\left(\frac{1}{n_s}\sin\theta_a\right)\right)}{4(n_s^2-\sin^2\theta_a)} \leq$$

$$d \leq \frac{\left(2N+\frac{9}{4}\right)n_s\lambda\cos\left(\sin^{-1}\left(\frac{1}{n_s}\sin\theta_a\right)\right)}{4(n_s^2-\sin^2\theta_a)}.$$

6. The vehicle according to claim 5, wherein
the reflection suppression layer includes another dielectric layer that adheres to a surface on the antenna part side of the dielectric layer; and
a relationship expressed by Formula 29 is satisfied, where $n_i$ is a refractive index of the another dielectric layer, $n_{i2}$ is a refractive index of a medium that is adjacent to the another dielectric layer on the antenna part side, and $d_i$ is a thickness of the another dielectric layer:

If $n_{i2} > n_i > n_s$ or $n_{i2} < n_i < n_s$, [Formula 29]

$$\frac{\left(2N+\frac{3}{4}\right)n_i\lambda\cos\left(\sin^{-1}\left(\frac{1}{n_i}\sin\theta_a\right)\right)}{4(n_i^2-\sin^2\theta_a)} \leq$$

-continued $$d_i \leq \frac{\left(2N + \frac{5}{4}\right)n_i\lambda\cos\left(\sin^{-1}\left(\frac{1}{n_i}\sin\theta_a\right)\right)}{4(n_i^2 - \sin^2\theta_a)}, \text{ and}$$

if $n_{i2} < n_i > n_s$ or $n_{i2} > n_i < n_s$, $$\frac{\left(2N + \frac{7}{4}\right)n_i\lambda\cos\left(\sin^{-1}\left(\frac{1}{n_i}\sin\theta_a\right)\right)}{4(n_i^2 - \sin^2\theta_a)} \leq$$

$$d_i \leq \frac{\left(2N + \frac{9}{4}\right)n_i\lambda\cos\left(\sin^{-1}\left(\frac{1}{n_i}\sin\theta_a\right)\right)}{4(n_i^2 - \sin^2\theta_a)}.$$

7. The vehicle according to claim 2, wherein the another dielectric layer has a refractive index that is lower than the refractive index of the dielectric layer and higher than the refractive index of air.

8. The vehicle according to claim 4, wherein the another dielectric layer has a refractive index that is lower than the refractive index of the dielectric layer and higher than the refractive index of air.

9. The vehicle according to claim 6, wherein the another dielectric layer has a refractive index that is lower than the refractive index of the dielectric layer and higher than the refractive index of air.

10. The vehicle according to claim 1, wherein the antenna part includes a transmitting antenna for transmitting the transmission wave; and an incident angle of the transmission wave on the reflection suppression layer at a center of a main lobe of the transmitting antenna is greater than 10 degrees.

11. The vehicle according to claim 2, wherein the antenna part includes a transmitting antenna for transmitting the transmission wave; and an incident angle of the transmission wave on the reflection suppression layer at a center of a main lobe of the transmitting antenna is greater than 10 degrees.

12. The vehicle according to claim 3, wherein the antenna part includes a transmitting antenna for transmitting the transmission wave; and an incident angle of the transmission wave on the reflection suppression layer at a center of a main lobe of the transmitting antenna is greater than 10 degrees.

13. The vehicle according to claim 4, wherein the antenna part includes a transmitting antenna for transmitting the transmission wave; and an incident angle of the transmission wave on the reflection suppression layer at a center of a main lobe of the transmitting antenna is greater than 10 degrees.

14. The vehicle according to claim 5, wherein the antenna part includes a transmitting antenna for transmitting the transmission wave; and an incident angle of the transmission wave on the reflection suppression layer at a center of a main lobe of the transmitting antenna is greater than 10 degrees.

15. The vehicle according to claim 6, wherein the antenna part includes a transmitting antenna for transmitting the transmission wave; and an incident angle of the transmission wave on the reflection suppression layer at a center of a main lobe of the transmitting antenna is greater than 10 degrees.

16. The vehicle according to claim 1, further comprising:
an antenna cover located between the antenna part and the windshield and covering a front of the antenna part;
wherein the antenna cover also serves as the reflection suppression layer.

17. The vehicle according to claim 2, further comprising:
an antenna cover located between the antenna part and the windshield and covering a front of the antenna part;
wherein the antenna cover also serves as the reflection suppression layer.

18. The vehicle according to claim 3, further comprising:
an antenna cover located between the antenna part and the windshield and covering a front of the antenna part;
wherein the antenna cover also serves as the reflection suppression layer.

19. The vehicle according to claim 5, further comprising:
an antenna cover located between the antenna part and the windshield and covering a front of the antenna part;
wherein the antenna cover also serves as the reflection suppression layer.

20. The vehicle according to claim 10, further comprising:
an antenna cover located between the antenna part and the windshield and covering a front of the antenna part;
wherein the antenna cover also serves as the reflection suppression layer.

* * * * *